United States Patent
Jo et al.

(10) Patent No.: US 10,637,051 B2
(45) Date of Patent: Apr. 28, 2020

(54) NEGATIVE ELECTRODE ACTIVE MATERIAL FOR LITHIUM SECONDARY BATTERY, METHOD OF PREPARING THE SAME, AND LITHIUM SECONDARY BATTERY INCLUDING THE MATERIAL

(71) Applicant: LG Chem, Ltd., Seoul (KR)

(72) Inventors: Rae Hwan Jo, Daejeon (KR); Ju Ho Chung, Daejeon (KR); Eun Kyung Kim, Daejeon (KR); Yong Ju Lee, Daejeon (KR); Seung Youn Choi, Daejeon (KR); Hyun Chul Kim, Daejeon (KR); Jung Hyun Choi, Daejeon (KR)

(73) Assignee: LG Chem, Ltd. (KR)

( * ) Notice: Subject to any disclaimer, the term of this patent is extended or adjusted under 35 U.S.C. 154(b) by 345 days.

(21) Appl. No.: 15/513,044

(22) PCT Filed: Oct. 1, 2015

(86) PCT No.: PCT/KR2015/010402
§ 371 (c)(1),
(2) Date: Mar. 21, 2017

(87) PCT Pub. No.: WO2016/053032
PCT Pub. Date: Apr. 7, 2016

(65) Prior Publication Data
US 2017/0309902 A1  Oct. 26, 2017

(30) Foreign Application Priority Data
Sep. 30, 2015 (KR) .................. 10-2015-0137454

(51) Int. Cl.
*H01M 4/38* (2006.01)
*H01M 2/10* (2006.01)
(Continued)

(52) U.S. Cl.
CPC ............. *H01M 4/386* (2013.01); *C01B 33/02* (2013.01); *H01M 2/10* (2013.01); *H01M 4/13* (2013.01);
(Continued)

(58) Field of Classification Search
CPC .......... H01M 4/386; H01M 4/13; H01M 4/38; H01M 4/62; H01M 2/10; H01M 10/052; H01M 10/0525; C01B 33/02
(Continued)

(56) References Cited

U.S. PATENT DOCUMENTS

| 5,395,711 A | 3/1995 | Tahara et al. |
| 2006/0051670 A1 | 3/2006 | Aramata et al. |

(Continued)

FOREIGN PATENT DOCUMENTS

| CN | 100474667 C | 4/2009 |
| CN | 101671026 A | 3/2010 |

(Continued)

OTHER PUBLICATIONS

English language abstract of CN 103663458 (no date).*

(Continued)

*Primary Examiner* — Amanda C. Walke
(74) *Attorney, Agent, or Firm* — Lerner, David, Littenberg, Krumholz & Mentlik, LLP (57) ABSTRACT

Provided are a negative electrode active material for a lithium secondary battery and a method of preparing the same, wherein since the negative electrode active material includes porous polycrystalline silicon and the porous polycrystalline silicon includes pores disposed at grain boundaries, the negative electrode active material may exhibit a buffering action by internally absorbing changes in volume (Continued)

of the active material during charge and discharge. As a result, lifetime characteristics of a negative electrode and a battery may be improved.

18 Claims, 3 Drawing Sheets

(51) Int. Cl.
*H01M 4/62* (2006.01)
*H01M 4/13* (2010.01)
*H01M 10/052* (2010.01)
*C01B 33/02* (2006.01)
*H01M 10/0525* (2010.01)

(52) U.S. Cl.
CPC ............. *H01M 4/38* (2013.01); *H01M 4/62* (2013.01); *H01M 10/052* (2013.01); *H01M 10/0525* (2013.01)

(58) Field of Classification Search
USPC ........................................................ 429/523
See application file for complete search history.

(56) References Cited

U.S. PATENT DOCUMENTS

| | | | |
|---|---|---|---|
| 2009/0029256 A1 | 1/2009 | Mah et al. | |
| 2012/0321959 A1* | 12/2012 | Yushin | H01M 4/587 429/225 |
| 2013/0078508 A1* | 3/2013 | Tolbert | H01M 4/134 429/188 |
| 2013/0216907 A1 | 8/2013 | Rayner et al. | |
| 2014/0030597 A1 | 1/2014 | Jung et al. | |
| 2014/0147751 A1 | 5/2014 | Yang et al. | |
| 2016/0133918 A1* | 5/2016 | Xiao | H01M 4/0404 29/623.5 |
| 2016/0308205 A1* | 10/2016 | Canham | H01M 4/134 |
| 2018/0069233 A1* | 3/2018 | Matus | H01M 4/386 |
| 2018/0145334 A1* | 5/2018 | Song | H01M 4/0416 |
| 2018/0333356 A1* | 11/2018 | Feaver | H01M 4/366 |
| 2019/0081316 A1* | 3/2019 | Zoitos | H01M 4/131 |

FOREIGN PATENT DOCUMENTS

| | | | | |
|---|---|---|---|---|
| CN | 102157731 A | | 8/2011 | |
| CN | 103663458 B | * | 9/2016 | ........... C01B 33/021 |
| JP | S60195016 A | | 10/1985 | |
| JP | H0613547 A | | 1/1994 | |
| JP | 2997741 B2 | | 1/2000 | |
| JP | 2004214054 A | | 7/2004 | |
| JP | 2006100255 A | | 4/2006 | |
| JP | 2011121852 A | | 6/2011 | |
| JP | 2013008487 A | | 1/2013 | |
| JP | 2013203626 A | | 10/2013 | |
| JP | 2014513385 A | | 5/2014 | |
| JP | 2014123575 A | | 7/2014 | |
| KR | 2004-0082876 A | | 9/2004 | |
| KR | 20090011888 A | | 2/2009 | |
| KR | 20140013469 A | | 2/2014 | |

OTHER PUBLICATIONS

Extended European Search Report for Application No. EP15846949 dated Jun. 26, 2017.
International Search Report from PCT/KR2015/010402, dated Jan. 14, 2016.
Chinese Search Report for Application No. 201580053723.0 dated Sep. 3, 2019, pp. 1-2.

* cited by examiner

NEGATIVE ELECTRODE ACTIVE MATERIAL FOR LITHIUM SECONDARY BATTERY, METHOD OF PREPARING THE SAME, AND LITHIUM SECONDARY BATTERY INCLUDING THE MATERIAL

CROSS-REFERENCE TO RELATED APPLICATIONS

The present application is a national phase entry under 35 U.S.C. § 371 of International Application No. PCT/KR2015/010402, filed Oct. 1, 2015, published in Korean, which claims priority to and the benefit of Korean Patent Application Nos. 2014-0133430, filed on Oct. 2, 2014, and 2015-0137454, filed on Sep. 30, 2015, in the Korean Intellectual Property Office, the entire contents of which are incorporated herein by reference.

TECHNICAL FIELD

The present invention relates to a negative electrode active material for a lithium secondary battery, a method of preparing the same, and a lithium secondary battery including the negative electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used. In particular, techniques for developing a high capacity and high power negative electrode active material have been required as the lithium secondary battery market has recently expanded from small-sized lithium secondary batteries used in portable devices to large-sized secondary batteries used in vehicles. Thus, development of non-carbon-based negative electrode active materials based on materials, such as silicon, tin, germanium, zinc, and lead, having a higher theoretical capacity than a carbon-based negative electrode active material has been conducted.

Among the above materials, since a silicon-based negative electrode active material has a capacity (4,190 mAh/g) 11 times or more higher than a theoretical capacity (372 mAh/g) of a carbon-based negative electrode active material, the silicon-based negative electrode active material is on the spotlight as a material for replacing the carbon-based negative electrode active material. However, since the volume expansion of the silicon-based negative electrode active material during the intercalation of lithium ions is 3 times or more when silicon is only used, the collapse of the silicon-based negative electrode active material occurs as charging and discharging of the battery proceed. As a result, the capacity may be reduced by losing electrical contacts.

Thus, in order to address the above limitation, a method of using nano-sized silicon, a method of using rod or fiber-shaped silicon, or a method of using porous silicon has been proposed.

One of the most common methods of preparing the nano-sized silicon is a method of preparing nano-sized silicon particles, particularly, silicon particles having a diameter of a few tens to a few hundred nanometers, by grinding large silicon particles. However, the above method has limitations in that surface oxidation of silicon may easily occur during the grinding process and the initial efficiency may be reduced due to amorphous $SiO_2$ which is formed on the surface of the silicon as a result of the oxidation. Also, with respect to the rod or fiber-shaped nano-silicon material, since its manufacturing process is complicated and manufacturing costs are high, mass production of the rod or fiber-shaped nano-silicon material may be difficult. Also, with respect to the porous silicon, since pores are formed only in the surface of the powder, a sufficient buffering action is difficult to be obtained during changes in the volume of the active material according to charge and discharge. Thus, lifetime characteristics may degrade.

DISCLOSURE OF THE INVENTION

Technical Problem

The present invention provides a negative electrode active material for a lithium secondary battery which may improve lifetime characteristics of a negative electrode and a battery by internally absorbing changes in volume of the active material according to charge and discharge to exhibit a buffering action.

The present invention also provides a method of preparing the above-described negative electrode active material.

The present invention also provides a negative electrode including the above negative electrode active material.

The present invention also provides a lithium secondary battery, a battery module, and a battery pack which include the above negative electrode.

Technical Solution

According to an aspect of the present invention, there is provided a negative electrode active material for a lithium secondary battery including porous polycrystalline silicon, wherein the porous polycrystalline silicon includes pores disposed at grain boundaries.

According to another aspect of the present invention, there is provided a method of preparing a negative electrode active material for a lithium secondary battery including performing a heat treatment on polycrystalline silicon including a metal impurity and cooling the polycrystalline silicon to prepare polycrystalline silicon including the metal impurity at grain boundaries; and preparing porous polycrystalline silicon, in which pores are formed at grain boundaries, by performing an acid treatment on the polycrystalline silicon including the metal impurity at grain boundaries to dissolve the metal impurity.

According to another aspect of the present invention, there is provided a negative electrode including the above negative electrode active material.

According to another aspect of the present invention, there is provided a lithium secondary battery, a battery module, and a battery pack which include the above negative electrode.

Advantageous Effects

Since a negative electrode active material for a lithium secondary battery according to the present invention may include porous polycrystalline silicon in which pores are formed at grain boundaries, the negative electrode active material may exhibit a buffering action by internally absorbing changes in volume of the active material during charge and discharge. As a result, lifetime characteristics of a negative electrode and a battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 2A is a photograph in which a cross-section of polycrystalline silicon powder before a heat treatment is observed by using an SEM.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A negative electrode active material for a lithium secondary battery according to an embodiment of the present invention includes porous polycrystalline silicon, wherein the porous polycrystalline silicon includes pores disposed at grain boundaries.

In the present invention, the expression "grain boundary" denotes a boundary in which one crystal and an adjacent crystal, or two crystals having the same structure but different orientations, in a polycrystalline material are in contact with each other.

Specifically, in the negative electrode active material for a lithium secondary battery according to the embodiment of the present invention, the porous polycrystalline silicon is an aggregate of silicon single crystals, wherein the porous polycrystalline silicon includes grain boundaries due to the contacts between the silicon single crystals, and the grain boundary surrounds the silicon single crystal.

Since the negative electrode active material for a lithium secondary battery may include pores at the grain boundaries, the negative electrode active material may exhibit a buffering action by controlling changes in volume of the negative electrode active material according to charge and discharge in a crystalline level. As a result, the collapse of the negative electrode active material may be more effectively prevented, and thus, the negative electrode active material for a lithium secondary battery according to the embodiment of the present invention may more effectively prevent the degradation of lifetime characteristics of a negative electrode than a silicon-based negative electrode active material having no pores therein or a silicon-based negative electrode active material having pores only in surfaces of particles.

The pores are formed by dissolution removal of metal impurity and fine grains which are included in a polycrystalline silicon raw material and concentrated at grain boundaries by a heat treatment. As a result, size and porosity of pores included in the porous polycrystalline silicon may be adjusted by controlling the amount of the metal impurity included in the polycrystalline silicon raw material.

Also, in the negative electrode active material for a lithium secondary battery according to the embodiment of the present invention, the porous polycrystalline silicon may further include surface pores according to the dissolution removal of the metal impurity present on the surface when the metal impurity of the raw material is present on the surface of the raw material.

Furthermore, in the negative electrode active material for a lithium secondary battery according to the embodiment of the present invention, the porosity of the porous polycrystalline silicon may be in a range of 5 vol % to 80 vol %. When the porosity of the porous polycrystalline silicon is less than 5 vol %, a buffering effect on the changes in the volume of the active material may be insignificant, and when the porosity of the porous polycrystalline silicon is greater than 80 vol %, mechanical strength of the porous polycrystalline silicon itself may be reduced. In the present invention, the porosity, the distribution of the pores in the porous polycrystalline silicon, and the presence of open pores formed in the surface are measured by mercury intrusion porosimetry at a pressure of 2,000 kg/cm$^2$.

Also, in the negative electrode active material for a lithium secondary battery according to the embodiment of the present invention, the porous polycrystalline silicon includes silicon nanograins and, for example, may include silicon nanograins having an average grain size of 3 nm to 300 nm. Thus, a better effect of improving battery characteristics may be obtained by including the nanoscale silicon grains.

In the present invention, the size of the grains in the polycrystalline silicon may be determined by an American Society for Testing and Materials (ASTM) grain size number. Specifically, when the number of grains in 1 square inch (1×in$^2$) is z in a photograph of the polycrystalline silicon taken at 100× magnification, $z=2^{(N-1)}$. Herein, N is the ASTM grain size number. When the above equation is summarized with respect to N, the following Equation 1 is obtained.

$$N=(\log z/\log 2)+1 \quad \text{[Equation 1]}$$

Also, in the negative electrode active material for a lithium secondary battery according to the embodiment of the present invention, an average particle diameter ($D_{50}$) of the porous polycrystalline silicon may be in a range of 0.01 μm to 50 μm. When the average particle diameter of the porous polycrystalline silicon is less than 0.01 μm, dispersion in a composition for forming a negative electrode may be reduced due to the agglomeration of polycrystalline silicon, and when the average particle diameter of the porous polycrystalline silicon is greater than 50 μm, activity may be reduced due to the reduction of a specific surface area. For example, the average particle diameter ($D_{50}$) of the porous polycrystalline silicon may be in a range of 0.05 μm to 20 μm in consideration of significant improvement due to the optimization of the average particle diameter of the polycrystalline silicon.

In the present invention, the average particle diameter ($D_{50}$) of the porous polycrystalline silicon may be defined as a particle diameter at 50% in a cumulative particle diameter distribution. The average particle diameter ($D_{50}$) of polycrystalline silicon particles according to an embodiment of the present invention, for example, may be measured by using a laser diffraction method. Specifically, the average particle diameter ($D_{50}$) of the polycrystalline silicon may be measured in such a manner that the particles of the polycrystalline silicon are dispersed in a dispersant, the dispersant is introduced into a commercial laser diffraction particle size measurement instrument (e.g., Microtrac MT 3000™ by NIKKISO Co., Ltd.) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, in the negative electrode active material for a lithium secondary battery according to the embodiment of the present invention, the porous polycrystalline silicon may unavoidable include a metal impurity, such as a catalyst, which is used in a preparation process or is formed as a result of a reaction during the preparation process. Specifically, the metal impurity may include nickel (Ni), scandium (Sc), titanium (Ti), vanadium (V), chromium (Cr), manganese (Mn), iron (Fe), cobalt (Co), copper (Cu), zinc (Zn), yttrium (Y), zirconium (Zr), niobium (Nb), molybdenum (Mo), ruthenium (Ru), rhodium (Rh), palladium (Pd), lanthanum (La), hafnium (Hf), tantalum (Ta), tungsten (W), rhenium (Re), osmium (Os), magnesium (Mg), calcium (Ca), phosphorus (P), aluminum (Al), germanium (Ge), tin (Sn), antimony (Sb), bismuth (Bi), or lithium (Li), and any one or a mixture of two or more thereof may be included.

However, in a case in which the metal impurity remains in the porous polycrystalline silicon, the battery characteristics may be degraded due to the occurrence of a side reaction caused by the metal impurity. Thus, in the present invention, pores are formed at grain boundaries and simultaneously, the above-described metal impurity may be removed by an acid treatment during the preparation of the porous polycrystalline silicon. Also, the amount of the metal impurity in the finally prepared porous polycrystalline silicon may be reduced to a level that does not degrade the battery characteristics by optimizing conditions of the heat treatment and acid treatment in the preparation process. Specifically, in the negative electrode active material for a lithium secondary battery according to the embodiment of the present invention, the porous polycrystalline silicon may include the above-described metal impurity in an amount of 2,000 ppm or less and, for example, may not include the metal impurity.

Also, the negative electrode active material for a lithium secondary battery according to the embodiment of the present invention may further include a coating layer including a carbon-based material on the particles of the porous polycrystalline silicon.

The coating layer including a carbon-based material may improve output characteristics and cycle characteristics of the battery by increasing conductivity of the negative electrode active material, and may increase a stress-relieving effect during the changes in the volume of the negative electrode active material.

Specifically, the carbon-based material may include any one selected from the group consisting of amorphous carbon and crystalline carbon, or a mixture of two or more thereof. The amorphous carbon may include soft carbon (low-temperature sintered carbon) or hard carbon (high-temperature sintered carbon), and the crystalline carbon may include natural graphite or artificial graphite. Among these materials, the carbon-based material, for example, may be amorphous carbon in consideration of the improvement in the battery characteristics, such as lifetime characteristics and low-temperature characteristics, of the lithium secondary battery.

Also, the shape of the carbon-based material is not particularly limited, and the carbon-based material may have various shapes such as a planar, spherical, or fibrous shape.

The coating layer including a carbon-based material may be included in an amount of 50 wt % or less, or 1 wt % to 50 wt %, based on a total weight of the negative electrode active material. When the amount of the coating layer including a carbon-based material is greater than 50 wt %, an irreversible reaction may occur to reduce initial efficiency. For example, the amount of the coating layer including a carbon-based material may be in a range of 1 wt % to 30 wt %, particularly, 1 wt % to 10 wt %.

According to another embodiment of the present invention, a method of preparing the above-described negative electrode active material is provided.

Specifically, the method of preparing a negative electrode active material according to the embodiment of the present invention includes the steps of: performing a heat treatment on polycrystalline silicon including a metal impurity and cooling the polycrystalline silicon to prepare polycrystalline silicon including the metal impurity at grain boundaries (step 1), and preparing porous polycrystalline silicon, in which pores are formed at grain boundaries, by performing an acid treatment on the polycrystalline silicon including the metal impurity at grain boundaries to dissolve the metal impurity (step 2).

Hereinafter, each step will be described in detail, wherein step 1 is a step of performing a heat treatment on a polycrystalline silicon raw material including a metal impurity and cooling the polycrystalline silicon raw material to prepare polycrystalline silicon including the metal impurity at grain boundaries.

A raw material prepared according to a conventional preparation method may be used or commercially available polycrystalline silicon may be used as the polycrystalline silicon raw material including a metal impurity. However, since the metal impurity included in the polycrystalline silicon may affect the porosity and the formation of pores, a polycrystalline silicon raw material including an appropriate amount of the metal impurity may be used in consideration of the porosity that affects the effect of the negative electrode active material. Specifically, the polycrystalline silicon raw material may be metal grade silicon typically used as a negative electrode active material of a secondary battery, and may particularly be metal grade silicon having an amount of metal impurity of 100,000 ppm or less, for example, 50,000 ppm or less.

Also, in the polycrystalline silicon, the metal impurity is a metallic material avoidably included in the preparation process of the polycrystalline silicon raw material and, specifically, may include one selected from the group consisting of Ni, Sc, Ti, V, Cr, Mn, Fe, Co, Cu, Zn, Y, Zr, Nb, Mo, Ru, Rh, Pd, La, Hf, Ta, W, Re, Os, Mg, Ca, P, Al, Ge, Sn, Sb, Bi, and Li, or a mixture of two or more thereof.

Furthermore, in the method of preparing a negative electrode active material according to the embodiment of the present invention, the heat treatment of the polycrystalline silicon raw material including the metal impurity may be performed in a temperature of 750° C. to 1,400° C. in an inert atmosphere. When the heat treatment is performed under the above-described conditions, the metal impurity distributed throughout the polycrystalline silicon raw material moves to the grain boundaries. When the temperature during the heat treatment is less than 750° C., the movement of the metal impurity toward the grain boundaries is not smooth, and, as a result, the size of the pores formed at the grain boundaries and porosity may be reduced. Also, when the temperature during the heat treatment is greater than 1,400° C., since the melting of silicon (Si) occurs, a porous structure may not be formed.

Also, in the method of preparing a negative electrode active material according to the embodiment of the present invention, the temperature during the heat treatment may be constantly maintained to concentrate the metal impurity in the grain boundaries.

After the heat treatment, a cooling process is performed to prevent the movement of the metal impurity concentrated in the grain boundaries.

The cooling may be performed by a method of cooling the heat treated porous silicon to a temperature of 20° C. to 30° C., and, in this case, the cooling method may be performed according to a conventional method such as water washing, ventilation, and ice bath immersion. Also, a cooling rate during the cooling is not particularly limited, but, for example, the temperature may be rapidly decreased to the above-described cooling temperature within 10 minutes.

Next, step 2 is a step of performing an acid treatment on the polycrystalline silicon including the metal impurity at grain boundaries, which is prepared in step 1, to dissolve the metal impurity.

In the method of preparing a negative electrode active material according to the embodiment of the present invention, the acid treatment may be performed by dipping in any one of inorganic acids, such as hydrofluoric acid, hydrochloric acid, sulfuric acid, nitric acid, or phosphoric acid, or a mixture of two or more thereof. In this case, the acid may be used in a dilute solution phase by adding water or alcohol.

As a result of the acid treatment, the metal impurity present at the grain boundaries of the polycrystalline silicon and fine grains are removed by dissolution, and pores are formed at these sites.

In this case, the above-described acid treatment may be performed once or more, particularly, once or twice, in consideration of the porosity and the amount of the metal impurity in the finally prepared porous polycrystalline silicon.

Also, after the acid treatment, a washing process and a drying process of the polycrystalline silicon obtained as the result of the acid treatment may be selectively further performed.

The washing process and drying process may be performed according to conventional methods. Specifically, the washing process may be performed by a method, such as impregnation and rinsing, using water, alcohol, or a mixed solution thereof. Also, the drying process may be performed by heating or a hot air treatment in a temperature range, in which a residual solvent component may be evaporated and removed, for example, from 80° C. to 120° C.

Also, the method of preparing a negative electrode active material according to the embodiment of the present invention may further include performing a surface treatment with a carbon-based material, after the preparation of the porous polycrystalline silicon.

The surface treatment with the carbon-based material may be performed by a conventional method of forming a carbon-based coating layer, such as surface coating by deposition, coating, spraying, impregnation, dry mixing, or compression of a carbon-based material; mechanical alloying; and carbonization by the calcination of an organic material. A coating layer may be formed by a method such as a method, in which the surface is coated with a low crystalline or amorphous carbon precursor, or the surface is coated with an amorphous carbon precursor and then heat-treated to carbonize the carbon precursor, or spray coating. In addition, the coating layer may be formed by a method such as pitch coating or chemical vapor deposition (CVD). In this case, type and amount of the carbon-based material are the same as described above.

According to another embodiment of the present invention, a negative electrode for a lithium secondary battery including the above-described negative electrode active material is provided.

Specifically, the negative electrode includes a negative electrode current collector and a negative electrode active material layer which is formed on the negative electrode current collector and includes the above-described negative electrode active material.

In the negative electrode according to the embodiment of the present invention, the negative electrode current collector is not particularly limited so long as it has high conductivity without causing adverse chemical changes in the batteries, and, for example, copper, stainless steel, aluminum, nickel, titanium, fired carbon, copper or stainless steel that is surface-treated with one of carbon, nickel, titanium, or silver, or an aluminum-cadmium alloy may be used. Also, the negative electrode current collector may typically have a thickness of 3 µm to 500 µm and may have a surface with fine roughness to improve bonding strength with the negative electrode active material. The negative electrode current collector may be used in various shapes, for example, a film, a sheet, a foil, a net, a porous body, a foam body, or a non-woven fabric body.

The negative electrode active material layer selectively includes a binder and a conductive agent as well as a negative electrode active material. In this case, the negative electrode active material is the same as described above.

The conductive agent is used for providing conductivity to the electrode, wherein any conductive agent may be used without particular limitation so long as it has suitable electronic conductivity without causing adverse chemical changes in the batteries. Specific examples of the conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used. Among these materials, the conductive agent may be the carbon-based material, such as carbon black, in consideration of the significant improvement when mixed with the above-described negative electrode active material including porous polycrystalline silicon and a high-temperature drying process in the preparation process of the negative electrode. The conductive agent may typically be included in an amount of 1 wt % to 30 wt % based on a total weight of the negative electrode active material layer.

Also, the binder functions to improve binding between the negative electrode active material particles and adhesion between the negative electrode active material and the current collector. Specific examples of the binder may be polyvinylidene fluoride (PVDF), a polyvinylidene fluoride-hexafluoropropylene copolymer (PVDF-co-HEP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used. Among these materials, the binder may be an aqueous binder in consideration of significant improvement when mixed with the above-described negative electrode active material including porous polycrystalline silicon, and, among the aqueous binders, the binder may be a styrene-butadiene rubber in consideration of the significant improvement, adhesion ability of the binder itself, and the high-temperature drying process in the preparation process of the negative electrode. The binder may be included in an amount of 1 wt % to 30 wt % based on the total weight of the negative electrode active material layer.

The negative electrode having the above-described structure may be prepared by a conventional method of preparing a negative electrode except that the above-described negative electrode active material is used. Specifically, the negative electrode may be prepared by coating the negative electrode current collector with a composition for forming a negative electrode active material layer, which is prepared by dissolving or dispersing the above-described negative electrode active material, binder, and conductive agent in a solvent, and then drying the coated negative electrode current collector. In this case, type and amount of the negative electrode active material, binder, and conductive agent are the same as described above.

Also, a solvent typically used in the art may be used as the solvent which may be used in the preparation of the composition for forming a negative electrode active material layer. The solvent may include dimethyl sulfoxide (DMSO), isopropyl alcohol, N-methylpyrrolidone (NMP), acetone, or water, and one alone or a mixture of two or more thereof may be used. The amount of the solvent used is sufficient if a viscosity, in which the negative electrode active material, conductive agent, and binder may be dissolved or dispersed and excellent thickness uniformity may be obtained during subsequent coating for the preparation of the negative electrode, may be obtained in consideration of a coating thickness of a slurry and a manufacturing yield.

Furthermore, the composition for forming a negative electrode active material layer may further include a thickener with the above-described components. Specifically, the thickener may be a cellulose-based compound such as carboxymethyl cellulose (CMC). The thickener may be included in an amount of 0.1 wt % to 10 wt % based on the total weight of the negative electrode active material layer.

Also, as another method, the composition for forming a negative electrode active material layer is cast on a separate support, and the negative electrode may be prepared by separating a film from the support and then laminating the film on the negative electrode current collector.

The negative electrode prepared according to the above-described preparation method may exhibit excellent lifetime characteristics without the reduction of the initial efficiency by including the above-described negative electrode active material.

According to another embodiment of the present invention, an electrochemical device including the negative electrode is provided. The electrochemical device may be specifically a battery or a capacitor and, for example, may be a lithium secondary battery.

Specifically, the lithium secondary battery includes a positive electrode, a negative electrode disposed to face the positive electrode, a separator disposed between the positive electrode and the negative electrode, and an electrolyte, and the negative electrode is the same as described above. Also, the lithium secondary battery may selectively further include a battery case accommodating an electrode assembly of the negative electrode, positive electrode, and separator, and a sealing member for sealing the battery case.

In the lithium secondary battery, the positive electrode includes a positive electrode current collector and a positive electrode active material layer which is formed on the positive electrode current collector and includes a positive electrode active material.

In the positive electrode, the positive electrode current collector is not particularly limited so long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode current collector may typically have a thickness of 3 μm to 500 μm and may have a surface with fine roughness to improve adhesion to the positive electrode active material. The positive electrode current collector may be used in various shapes, for example, a film, a sheet, a foil, a net, a porous body, a foam body, a non-woven fabric body, and the like.

The positive electrode active material layer may include a conductive agent and a binder as well as the positive electrode active material.

Furthermore, in the positive electrode active material layer, a compound (lithiated intercalation compound) capable of reversibly intercalating and deintercalating lithium may be used as the positive electrode active material. Specifically, at least one of composite oxides of lithium and a metal, such as cobalt, manganese, nickel, or a combination thereof, may be used, and, for example, a lithium metal compound represented by the following Formula 1 may be used.

$$Li_xM_yM'_zO_2$$ [Formula 1]

(in Formula 1, M and M' are each independently elements selected from the group consisting of Fe, Ni, Co, Mn, Cr, Zr, Nb, Cu, V, Mo, Ti, Zn, Al, Gallium (Ga), Mg, boron (B), and a combination thereof, and x, y, z are atomic fractions of respectively independent oxide composition elements, wherein $0<x\leq1$, $0<y\leq1$, and $0<x+y+z\leq2$).

Among these materials, the positive electrode active material may be selected from the group consisting of $LiCoO_2$, $LiMnO_2$, $LiNiO_2$, lithium nickel manganese cobalt oxide (e.g., $Li(Ni_{0.6}Mn_{0.2}CO_{0.2})O_2$, $LiNi_{0.5}Mn_{0.3}Co_{0.2}O_2$, or $LiNi_{0.8}Mn_{0.1}Co_{0.1}O_2$) or lithium nickel cobalt aluminum oxide (e.g., $LiNi_{0.8}Co_{1.15}Al_{0.05}O_2$), and a mixture thereof.

The positive electrode as described above may be prepared by a conventional method of preparing a positive electrode. Specifically, the positive electrode may be prepared by coating a positive electrode current collector with a composition for forming a positive electrode active material layer, which is prepared by dissolving a conductive agent and a binder as well as the positive electrode active material in a solvent, and then drying and rolling the coated positive electrode current collector. In this case, the binder, conductive agent, and solvent included in the positive electrode active material layer may be the same as those previously described in the negative electrode.

In the lithium secondary battery, the separator separates the negative electrode and the positive electrode and provides a moving path of lithium ions, wherein the separator may be used without particular limitation so long as it is used as a separator in a typical lithium secondary battery, and, in particular, a separator having high moisture-retention ability for an electrolyte solution as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure of two or more layers thereof may be used. Also, a typical porous nonwoven fabric, for example, a nonwoven fabric formed of high melting point glass fibers or polyethylene terephthalate fibers may be used. Also, in order to secure heat resistance and mechanical strength, a coated separator including a ceramic component or polymer material may be used and may be selectively used in a single layer or multilayer structure.

Furthermore, the electrolyte used in the present invention may include an organic-based liquid electrolyte, an inorganic-based liquid electrolyte, a solid polymer electrolyte, a gel-type polymer electrolyte, a solid inorganic electrolyte, and a molten inorganic electrolyte which may be used in the preparation of a lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of an electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the negative electrode active material according to the present invention stably exhibits excellent discharge capacity, output characteristics, and capacity retention ratio, the lithium secondary battery is suitable for portable devices, such as mobile phones, notebook computers, and digital cameras, and electric cars such as hybrid electric vehicles.

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

Polycrystalline silicon powder having an average particle diameter ($D_{50}$) of 5 μm (porosity: <1 vol %, average grain size: 49 nm) was heat treated at 1,350° C. for 1 hour in an argon (Ar) inert atmosphere to concentrate impurities at grain boundaries, was then rapidly cooled to 20° C. to 25° C. during 10 minutes by dipping in distilled water (DIW), and was acid-treated by dipping in an aqueous solution of 0.5 M hydrochloric acid for 30 minutes. As a result, porous polycrystalline silicon powder, in which a metal impurity was removed, was obtained and the powder was used as a negative electrode active material.

Example 2

The porous polycrystalline silicon powder prepared in Example 1 was mixed with 2 g of sucrose powder in 240 g of distilled water. A mixed solution thus obtained was injected into a spray dryer and then spray-dried to coat the porous polycrystalline silicon powder with the sucrose powder. In this case, an inlet temperature and an outlet temperature of the spray dryer were respectively set to 200° C. and 120° C., and a charging rate of the mixed solution was set to 20 ml/min. As a result of the spray drying process, porous polycrystalline silicon powder coated with the sucrose powder was obtained, and the porous polycrystalline silicon powder was sintered and carbonized in a sintering furnace at 500° C. for 2 hours in an argon atmosphere. As a result, porous polycrystalline silicon powder coated with amorphous carbon was obtained and the powder was used as a negative electrode active material. In this case, an amount of the amorphous carbon coating layer was 5 wt % based on a total weight of the negative electrode active material.

Comparative Example 1

10 g of the polycrystalline silicon powder having an average particle diameter ($D_{50}$) of 5 μm (porosity: <1 vol %, average grain size: 49 nm) and used in Example 1 was immersed in an etching solution, which was prepared by mixing 300 ml of a 5M hydrofluoric acid solution and 700 ml of a 0.015 M silver nitrate solution, at 50° C. for 30 minutes. In this case, $Ag^+$ ions of the silver nitrate solution receive electrons from silicon to be adsorbed on a surface of the silicon powder, and etching was performed by dissolving $Si^+$, which has lost electrons, in hydrofluoric acid (HF). Porous silicon powder after completion of the etching was neutralized using distilled water, was then immersed in a 20% nitric acid solution to remove silver (Ag) adsorbed on the surface, and again neutralized to prepare porous polycrystalline silicon powder. The powder was used as a negative electrode active material.

Comparative Example 2

The polycrystalline silicon powder having an average particle diameter ($D_{50}$) of 5 μm (porosity: <1 vol %, average grain size: 49 nm) and used in Example 1 was used as a negative electrode active material.

[Preparation Example: Preparation of Negative Electrode and Lithium Secondary Battery]

Lithium secondary batteries were prepared by using the negative electrode active materials prepared in Examples 1 and 2, respectively.

Specifically, a copper current collector was coated with a composition for forming a negative electrode active material layer (viscosity: 5,000 mPa·s), which was prepared by mixing 18 wt % of each of the porous powders prepared in Examples 1 and 2, 72 wt % of graphite, 5 wt % of carbon black as a conductive agent, and 5 wt % of a PVdF binder in an N-methylpyrrolidone solvent, and then dried to prepared a negative electrode.

Also, as a positive electrode active material, $LiNi_{0.4}Co_{0.3}Mn_{0.3}O_2$, carbon black as a conductive agent, and a PVdF binder were mixed in a weight ratio of 90:5:5 in an N-methylpyrrolidone solvent to prepare a composition for forming a positive electrode active material layer (viscosity: 5,000 mPa·s), an aluminum current collector was coated with the composition, and the coated collector was then dried and rolled to prepared a positive electrode.

An electrode assembly was prepared by disposing a porous polyethylene separator between the positive electrode and negative electrode thus prepared, the electrode assembly was disposed in a case, and a lithium secondary battery was then prepared by injecting an electrolyte solution into the case. In this case, the electrolyte solution was prepared by dissolving lithium hexafluorophosphate ($LiPF_6$) having a concentration of 1.5 M in an organic solvent composed of ethylene carbonate (EC)/dimethyl carbonate (DMC)/ethylmethyl carbonate (EMC) (mixed volume ratio of EC/DMC/EMC=3/4/3).

Experimental Example 1

The negative electrode active material prepared in Comparative Example 1 was observed by using a scanning electron microscope (SEM). The results thereof are presented in FIG. 1.

Figure 1:
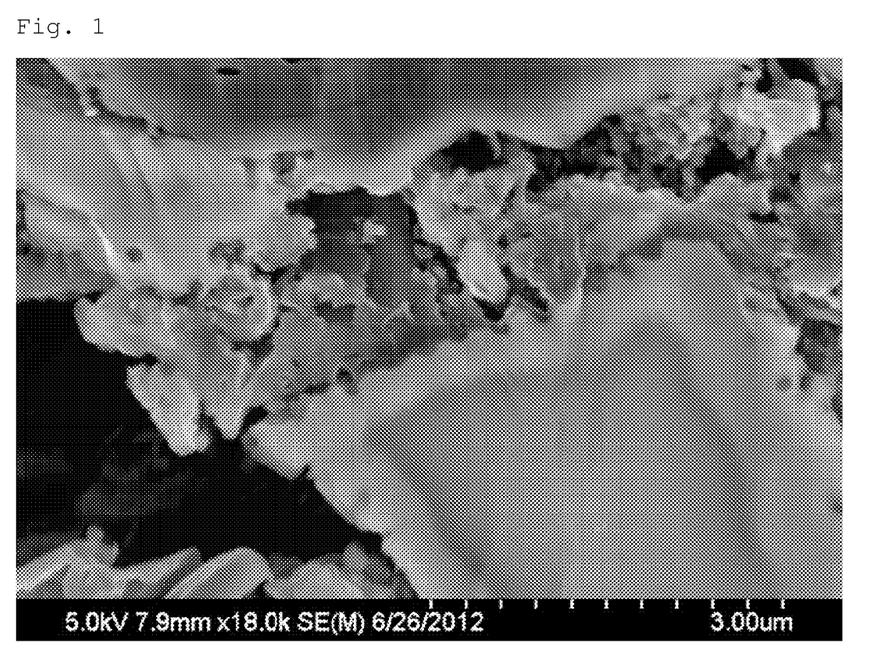
FIG. 1 is a photograph in which a cross-section of a negative electrode active material prepared in Comparative Example 1 is observed by using a scanning electron microscope (SEM)

As illustrated in FIG. 1, in a case in which the negative electrode active material was prepared by an acid treatment after a typical catalyst treatment, it may be confirmed that pores were partially formed only on the surface of silicon powder.

Experimental Example 2

Cross-sections of the polycrystalline silicon powders before and after the heat treatment during the preparation of the negative electrode active material in Example 1 were observed by using an SEM. The results thereof are presented in FIGS. 2A and 2B.

Figure 2A:
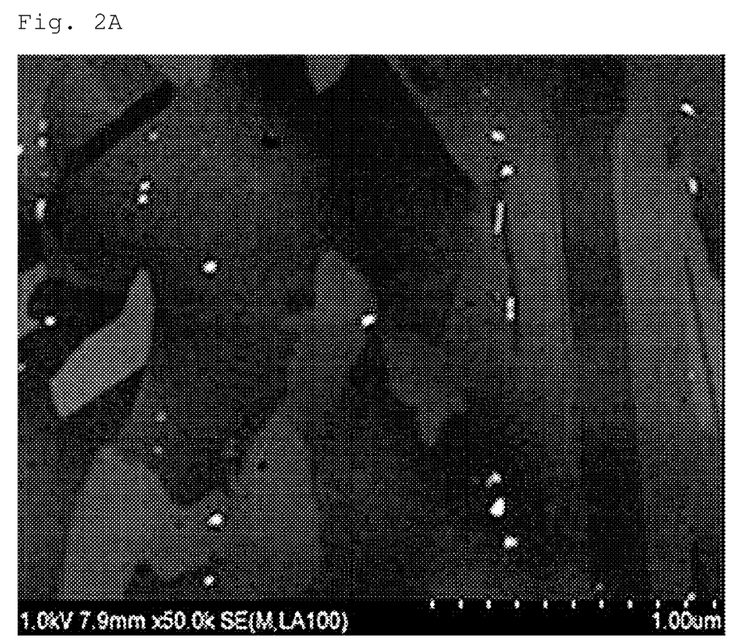
Figure 2B:
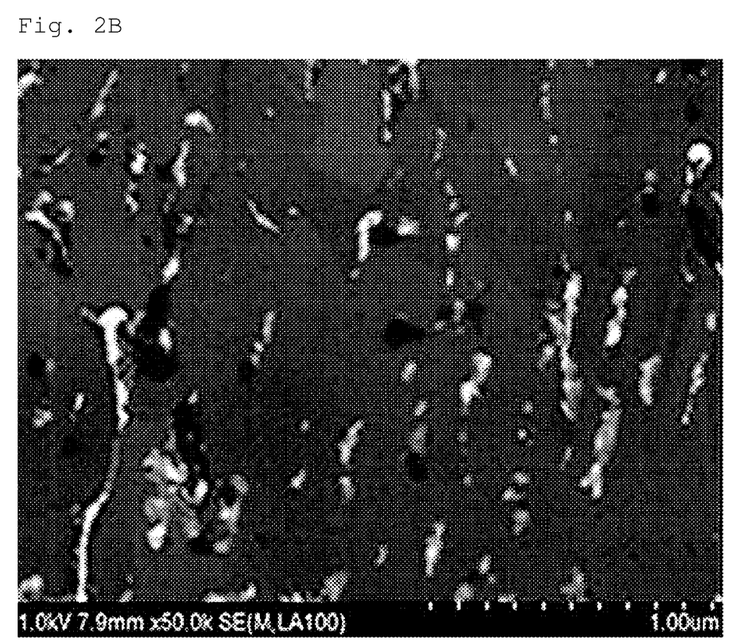
FIG. 2B is a photograph in which a cross-section of polycrystalline silicon powder after the heat treatment is observed by using an SEM, when preparing a negative electrode active material according to Example 1.

FIG. 2A is an SEM image of the cross-section of the polycrystalline silicon powder before the heat treatment and FIG. 2B is an SEM image of the cross-section of the polycrystalline silicon powder after the heat treatment during the preparation of the negative electrode active material according to Example 1.

As illustrated in FIGS. 2A and 2B, it may be confirmed that metal impurity was concentrated at grain boundaries of the polycrystalline silicon powder after the heat treatment.

Experimental Example 3

Changes in the amount of the metal impurity before/after the acid treatment of the heat-treated polycrystalline silicon powder during the preparation of the negative electrode active material in Example 1 were analyzed by using an inductively coupled plasma-atomic emission spectrometer (ICP-AES). The results thereof are presented in Table 1.

TABLE 1

|     | Before acid treatment (ppmw) | After acid treatment (ppmw) |
| --- | --- | --- |
| Fe  | 2,987 | 311 |
| Al  | 2,650 | 198 |
| Ni  | 678   | 112 |
| Ti  | 557   | 47  |
| Cu  | 61    | 9   |
| Mn  | 318   | 136 |
| V   | 207   | 97  |
| Sum | 7,458 | 910 |

Experimental Example 4

Porosity and average grain size were respectively measured for the negative electrode active materials of Example 1 and Comparative Examples 1 and 2. The results thereof are presented in Table 2 below.

The porosity of the negative electrode active material was measured by mercury intrusion porosimetry at a pressure of 2,000 kg/cm².

Also, the average grain size was measured by the above-described method using the ASTM grain size number.

TABLE 2

|  | Example 1 | Comparative Example 1 | Comparative Example 2 |
|---|---|---|---|
| Porosity (vol %) | 18 | 3 | <1 |
| Average grain size (nm) | 50 | 49 | 49 |

According to the experimental results, the negative electrode active material of Example 1 including the porous polycrystalline silicon according to the present invention had an equivalent level of average grain size, but had significantly high porosity in the active material particles in comparison to the negative electrode active materials of Comparative Examples 1 and 2.

Experimental Example 5

Half cells were prepared by using the negative electrode active materials of Examples 1 and 2 and Comparative Examples 1 and 2, and initial charge and discharge characteristics, capacity retention ratios, and effects of suppressing the thickness expansion of the negative electrode were then evaluated. The results thereof are presented in Table 3 below.

Specifically, a copper current collector was coated with a composition for forming a negative electrode active material layer, which was prepared by mixing 18 wt % of each of the negative electrode active materials prepared in Examples 1 and 2 and Comparative Examples 1 and 2, 72 wt % of graphite, 5 wt % of carbon black as a conductive agent, and 5 wt % of a PVdF binder in an NMP solvent, and then dried to prepared each negative electrode. Half cells (Li metal was used as a counter electrode) were prepared by using the negative electrodes.

Charge and discharge of the prepared half cells were performed at room temperature (25° C.) under conditions of 0.1 C/0.1 C, discharge capacity was then measured, and initial efficiency was calculated therefrom.

Also, charge and discharge under the same conditions as above were set as 1 cycle, the charge and discharge were repeated 50 cycles, and a capacity retention ratio in a $50^{th}$ cycle vs. discharge capacity in the first cycle was evaluated.

Figure 3:
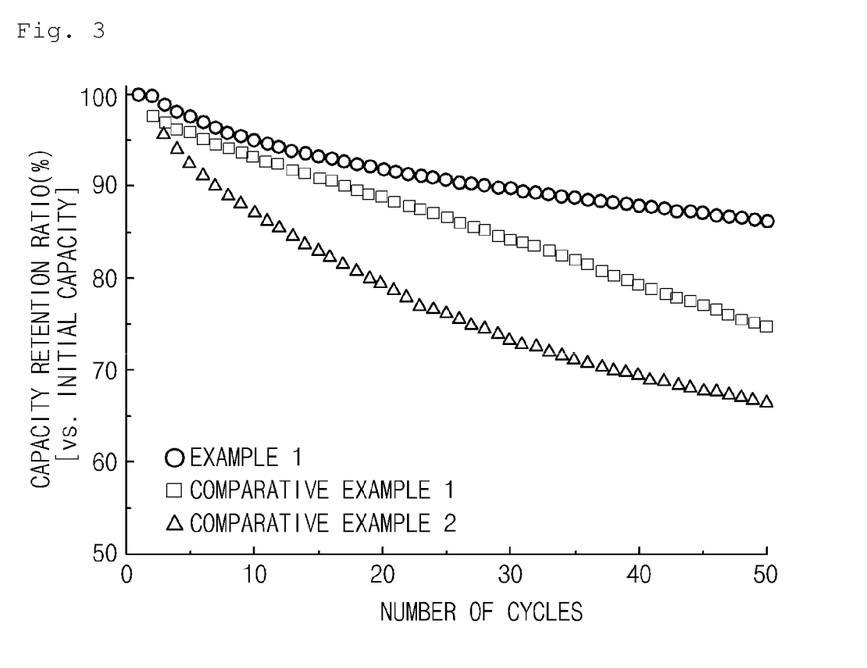
FIG. 3 is a graph illustrating results of evaluating capacity retention ratios of batteries including negative electrode active materials of Example 1 and Comparative Examples 1 and 2.

Furthermore, with respect to Example 1 and Comparative Examples 1 and 2, changes in the capacity retention ratio according to cycle were investigated, and the results thereof are presented in FIG. 3.

Also, a thickness expansion rate of the negative electrode after the $50^{th}$ charge and discharge cycle with respect to an initial thickness of the negative electrode was measured according to the following Equation 2.

Thickness expansion rate=[(thickness of fully charged negative electrode in the $50^{th}$ charge and discharge cycle-initial thickness of negative electrode)/(initial thickness of negative electrode-thickness of copper current collector)]    [Equation 2]

TABLE 3

|  | Discharge Capacity (mAh/g) | Initial efficiency (%) | Capacity retention ratio in the $50^{th}$ cycle (%) | Thickness expansion rate of negative electrode (%) |
|---|---|---|---|---|
| Example 1 | 887 | 85 | 86 | 98 |
| Example 2 | 882 | 89 | 87 | 97 |
| Comparative Example 1 | 879 | 87 | 75 | 131 |
| Comparative Example 2 | 892 | 90 | 66 | 189 |

According to the experimental results, the negative electrode active materials of Examples 1 and 2 including the porous polycrystalline silicon according to the present invention exhibited significantly improved capacity retention ratios and effects of suppressing the thickness expansion of the negative electrode due to the pores included at grain boundaries in comparison to the negative electrode active material of Comparative Example 1, which only included surface pores and did not include pores in the particles, and the negative electrode active material of Comparative Example 2 in which pore were not formed.

The invention claimed is:

1. A negative electrode active material for a lithium secondary battery, the negative electrode active material comprising:
   porous polycrystalline silicon, wherein the porous polycrystalline silicon is an aggregate of silicon single crystals, the silicon single crystals are silicon nanograins having an average grain size of 3 nm to 300 nm,
   wherein the porous polycrystalline silicon comprises pores disposed at grain boundaries, and
   wherein the porous polycrystalline silicon has an average particle diameter (D50) of 0.01 µm to 50 µm.

2. The negative electrode active material for a lithium secondary battery of claim 1, wherein the porous polycrystalline silicon further comprises pores formed on a surface of the porous polycrystalline silicon.

3. The negative electrode active material for a lithium secondary battery of claim 1, wherein the porous polycrystalline silicon has a porosity of 5 vol % to 80 vol %.

4. The negative electrode active material for a lithium secondary battery of claim 1, wherein the porous polycrystalline silicon comprises a metal impurity in an amount of 2,000 ppm or less.

5. The negative electrode active material for a lithium secondary battery of claim 1, wherein the porous polycrystalline silicon does not comprise a metal impurity.

6. The negative electrode active material for a lithium secondary battery of claim 1, further comprising a coating layer including a carbon-based material on a surface of the porous polycrystalline silicon.

7. The negative electrode active material for a lithium secondary battery of claim 6, wherein the carbon-based material comprises amorphous carbon.

8. The negative electrode active material for a lithium secondary battery of claim 6, wherein the coating layer including a carbon-based material is included in an amount of 50 wt % or less based on a total weight of the negative electrode active material.

9. A method of preparing a negative electrode active material for a lithium secondary battery, the method comprising:
   performing a heat treatment on polycrystalline silicon including a metal impurity and cooling the polycrystalline silicon to prepare polycrystalline silicon including the metal impurity at grain boundaries; and
   preparing porous polycrystalline silicon, in which pores are formed at grain boundaries, by performing an acid treatment on the polycrystalline silicon including the metal impurity at grain boundaries to dissolve the metal impurity.

10. The method of claim 9, wherein the metal impurity comprises one selected from the group consisting of nickel (Ni), scandium (Sc), titanium (Ti), vanadium (V), chromium (Cr), manganese (Mn), iron (Fe), cobalt (Co), copper (Cu), zinc (Zn), yttrium (Y), zirconium (Zr), niobium (Nb), molybdenum (Mo), ruthenium (Ru), rhodium (Rh), palladium (Pd), lanthanum (La), hafnium (Hf), tantalum (Ta), tungsten (W), rhenium (Re), osmium (Os), magnesium (Mg), calcium (Ca), phosphorus (P), aluminum (Al), germanium (Ge), tin (Sn), antimony (Sb), bismuth (Bi), and lithium (Li), or a mixture of two or more thereof.

11. The method of claim 9, wherein the heat treatment is performed in a temperature of 750° C. to 1,400° C.

12. The method of claim 9, wherein the cooling is performed by cooling to a temperature of 20° C. to 30° C. within 10 minutes.

13. The method of claim 9, wherein the acid comprises one selected from the group consisting of hydrofluoric acid, hydrochloric acid, sulfuric acid, nitric acid, and phosphoric acid, or a mixture of two or more thereof.

14. The method of claim 9, further comprising forming a coating layer including a carbon-based material on a surface of the porous polycrystalline silicon, after the preparation of the porous polycrystalline silicon.

15. A negative electrode for a lithium secondary battery comprising the negative electrode active material of claim 1.

16. A lithium secondary battery comprising the negative electrode of claim 15.

17. A battery module comprising the lithium secondary battery of claim 16 as a unit cell.

18. A battery pack comprising the battery module of claim 17.

* * * * *

UNITED STATES PATENT AND TRADEMARK OFFICE
CERTIFICATE OF CORRECTION

PATENT NO. : 10,637,051 B2
APPLICATION NO. : 15/513044
DATED : April 28, 2020
INVENTOR(S) : Rae Hwan Jo et al.

It is certified that error appears in the above-identified patent and that said Letters Patent is hereby corrected as shown below:

On the Title Page

Item (30) Foreign Application Priority Data, please add the following:
--Oct. 2, 2014 (KR) ........... 10-2014-0133430--

Signed and Sealed this
Thirtieth Day of June, 2020

Andrei Iancu
*Director of the United States Patent and Trademark Office*